United States Patent [19]

Miyahara et al.

[11] Patent Number: 4,747,656
[45] Date of Patent: May 31, 1988

[54] OPTICAL FIBER CONNECTOR WITH LOCKING MECHANISM

[75] Inventors: Yoshinori Miyahara; Kazuo Hasegawa, both of Furukawa, Japan

[73] Assignee: Alps Electric Co., Ltd., Japan

[21] Appl. No.: 861,544

[22] Filed: May 9, 1986

[30] Foreign Application Priority Data

May 9, 1985 [JP] Japan .................. 60-68339[U]

[51] Int. Cl.$^4$ .................................................. G02B 6/36
[52] U.S. Cl. ................................. 350/96.20; 250/227
[58] Field of Search ............... 350/96.20, 96.15, 96.21, 350/96.22; 250/227

[56] References Cited

U.S. PATENT DOCUMENTS

| | | | |
|---|---|---|---|
| 4,030,809 | 6/1977 | Onishi et al. | 350/96.21 |
| 4,398,797 | 8/1983 | Wedertz et al. | 350/96.21 |
| 4,432,602 | 2/1984 | Margolin | 350/96.20 |
| 4,435,036 | 3/1984 | Sasakawa | 350/96.20 |
| 4,539,476 | 9/1985 | Donuma et al. | 350/96.20 X |
| 4,684,210 | 8/1987 | Matsunaga et al. | 350/96.20 |

Primary Examiner—William L. Sikes
Assistant Examiner—Brian M. Healy
Attorney, Agent, or Firm—Guy W. Shoup

[57] ABSTRACT

An optical connector composed of a plug lock member provided on the end of a light guide pass and a plug attachable to/detachable from the plug lock member, which is characterized by a lock member provided on either the plug lock member or plug to be pressed onto a member to be held, a push member movable in the direction intersecting the attaching/detaching direction of the plug, push portions provided on the push member for pushing the lock member onto the member to be held, and a click mechanism provided on the push member, wherein when the member to be held is pressed by the lock member the click mechanism operates to lock the push member, whereby its locked state is maintained stable and can not be released even subjected to continuous vibration or pulling force.

4 Claims, 7 Drawing Sheets

OPTICAL FIBER CONNECTOR WITH LOCKING MECHANISM

BACKGROUND OF THE INVENTION

1. Field of the Invention

This invention relates to an improvement of the coupling configuration of an optical connector.

2. Description of the Prior Art

For reference, one conventional optical connector is shown in FIGS. 7 and 8, in which FIG. 7 is a perspective view illustrating the state before a receptacle is coupled with a plug provided on the end of an optical fiber cable and FIG. 8 is a sectional view in the plug insertion direction of an important portion of the receptacle and plug being coupled together. In these drawings, reference numeral 1 indicates a receptacle of rectangular prism shape, on one face of which a cylindrical body having a hole 2 serving as a member to be held is provided, with the end portion around the hole 2 of the cylindrical body having a thick stepped portion, thereby forming a plug lock member 3. An optical converting element 4 such as LED is incorporated and secured in the receptacle 1 so that its light emitting spot 5 is located on the center axis of the hole 2. Reference numeral 6 indicates a plug to which an optical fiber cable 9 of round rod shape having a protection coat 8 therearound is attached. This plug 6 has integral therewith an optical fiber holding cylindrical member 10 capable of being fitted precisely in the hole 2 of the receptacle 1, and the point face of this optical fiber holding member 10 has a small circular hole 10a opened there which is closed by the optical fiber cable so that the end face of an optical fiber 7 can be located on the optical axis of the light emitting spot 5. Inside the optical fiber holding member 10 the optical fiber can be incorporated together with its protection coat 8. On the opposite side of the plug 6 to the above there are provided circularly arm-shaped fixing portions 12, 12, . . . with slits left therebetween, and inside these fixing portions 12, 12, . . . the optical fiber cable 9 is press-fitted and secured by caulking a fixing member 11 therearound by means of external pressure. The end portion of the optical fiber cable 9, from which the protection coat 8 is removed a desired length, is fitted in the hole 10a of the optical fiber holding member 10, and the end surface is finished at the outer end face of the optical fiber holding member 10. Around the periphery of the optical fiber holding member 10 of the plug 6 there formed concentrically and integrally therewith elastic lock segments 13, 13, . . . with slits left therebetween, and the end portion each of these lock segments 13, 13, . . . has a projection engagable with the stepped portion of the plug lock member 3. As the holding member 10 is inserted the projections of the lock segments 13, 13, . . . move inward by means of their elastic strength and are engaged with the stepped portion of the plug lock member 3. In the thus attained state, the end face of the optical fiber 7 arranged on the end of the optical fiber holding member 10 is located closely on the optical axis of the light emitting spot 4; thus, an optical signal can be transmitted.

However, according to such a coupling configuration as above of the optical connector, due to external stress applied to the optical fiber cable 9, it comes out of coupling or turns, the positional relationship between the foregoing light emitting spot 4 and the end face of the optical fiber 7 changes, and the optical conversion efficiency varies; thus, the transmission of the optical signal is unstable. To solve the foregoing problem one configuration has been devised which is similar to that used in the air joint, for example, and is characterized in that by sliding a push member in the plug insertion direction it pushes lock segments so that they are secured on a member to be locked. However, this known configuration has the defect that if an adapter is moved through handling in the course of making a network of optical fiber cables under abutment of the push member on the corner of a desk, for example, the push member tends to move in the plug insertion direction so that its locked state will be released.

SUMMARY OF THE INVENTION

It is an object of the present invention to improve the coupling configuration of an optical connector so that it does not become loose even under continuous vibration and the efficiency of attaching/detaching work is similar to that of the bayonet lock type, with preserving in mechanical sense the stability of the screw lock type wherein coupling and securing are achieved through screwing.

To achieve the foregoing object, the present invention provides an optical connector composed of a plug lock member provided on the end of a light guide pass and a plug attachable to/detachable from the plug lock member, which is characterized by a lock member provided on either the plug lock member or plug to be pressed onto a member to be held, a push member movable in the direction intersecting the attaching/detaching direction of the plug, push portions provided on the push member for pushing the lock member onto the member to be held, and a click mechanism provided on the push member, wherein when the member to be held is pressed by the lock member the click mechanism operates to lock the push member.

The foregoing components function as follows: as the push member (15) is moved in the direction intersecting the attaching/detaching direction of the plug, lock portions (16, 16, . . . ) provided on either the plug lock member (3) or plug (6) are pushed onto a member to be held, whereby the rotation and slide in the insertion direction of an optical fiber holding member (10) provided on the plug (6) are prevented by the plug lock member (3) provided on the receptacle (1) or adapter. In conjunction with the above operation, cam portions (18, 18, . . . ) provided projectingly on the ends of elastic cam segments (17, 17, . . . ) are pushed and moved by click cams (20, 20, . . . ) provided on the push member (15). In response to this movement the click cams (20, 20, . . . ) climb over cam portion tops 18a, 18a, . . . ) and come up to cam portion bottoms (18b, 18b, . . . ). At this time, the cam portions (18, 18, . . . ) are pushed back toward the click cams (20, 20, . . . ) by means of the elasticity of the cam segments (17, 17, . . . ), and the cam portion bottoms (18b, 18b, . . . ) and click cams (20, 20, . . . ) come to press-contact with each other. In the thus attained state, the elastic cam portions (18, 18, . . . ) are in engagement with the click cams (20, 20, . . . ) of the push member (15). Consequently, because the click cams (20, 20, . . . ) are pushed by the cam portions (18, 18, . . . ), in order to cause the click cams (20, 20, . . . ) to climb over the cam portion tops (18a, 18a, . . . ) a certain external force of the lock releasing direction is required to be applied to the push member (15). By means of the click mechanism functioning in such a manner as above the push member (15) is locked.

DESCRIPTION OF THE PREFERRED EMBODIMENTS

Figure 1A:
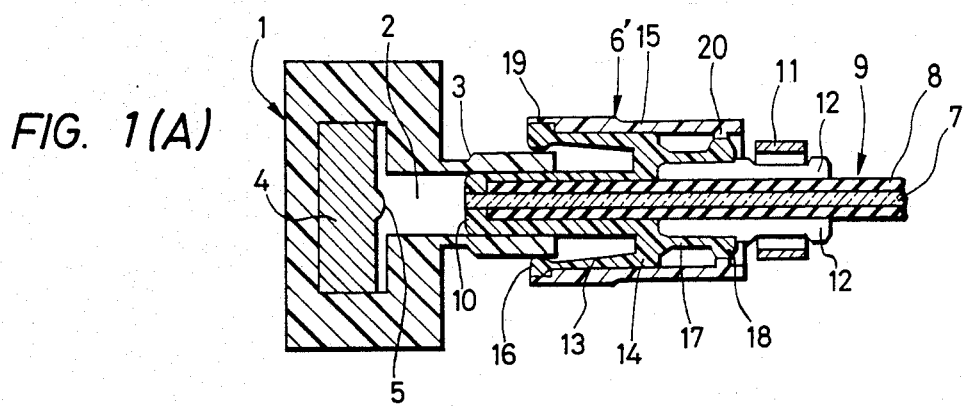
FIG. 1 is a sectional view of an important portion showing the plug insertion states of a first embodiment of the present invention.
Figure 1B:
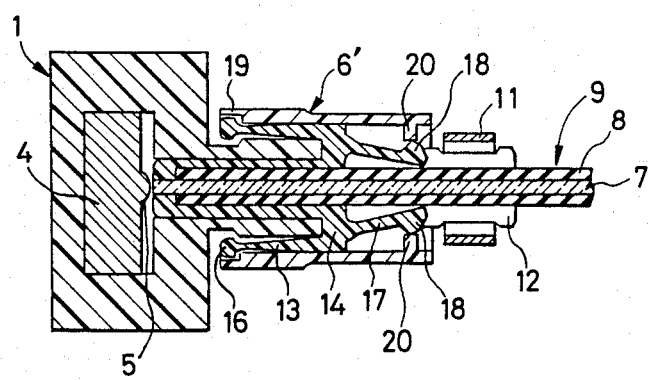
Figure 1C:
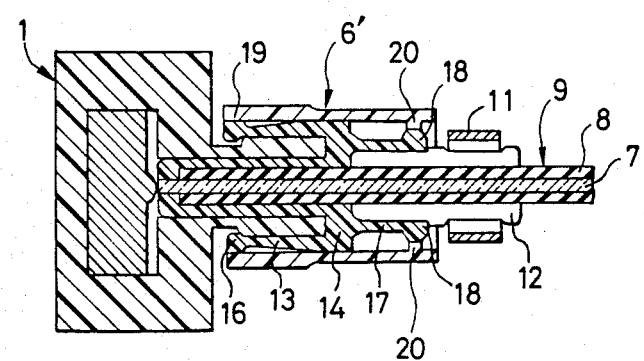
Figure 2A:
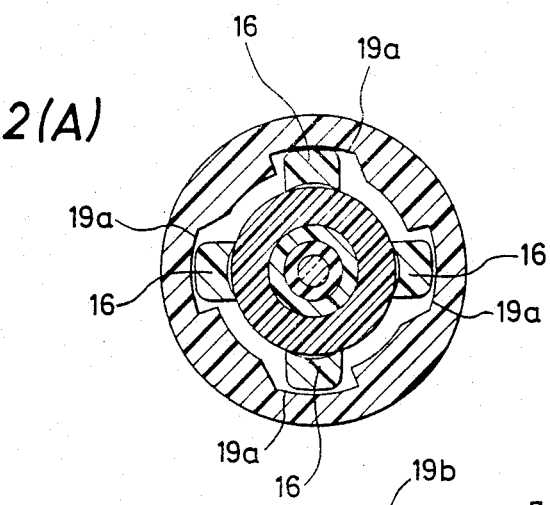
FIG. 2 is a sectional view of an important portion showing the respective states of a lock section of the above.
Figure 2B:
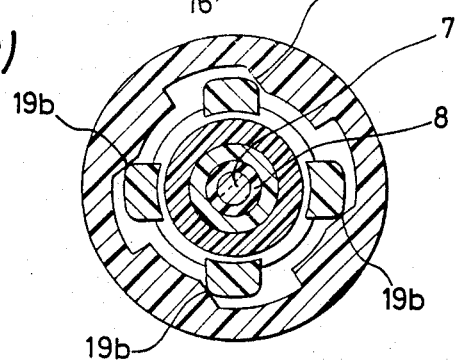
Figure 2C:
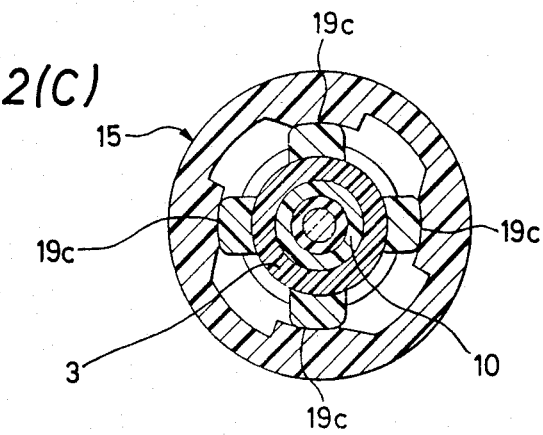
Figure 3A:
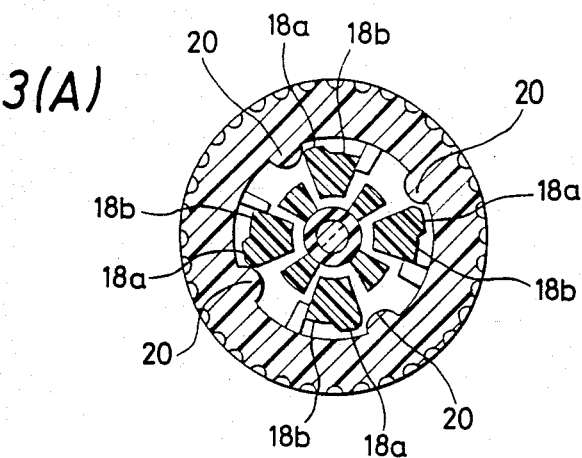
FIG. 3 is a sectional view of an important portion showing the respective states of a click mechanism of the above.
Figure 3B:
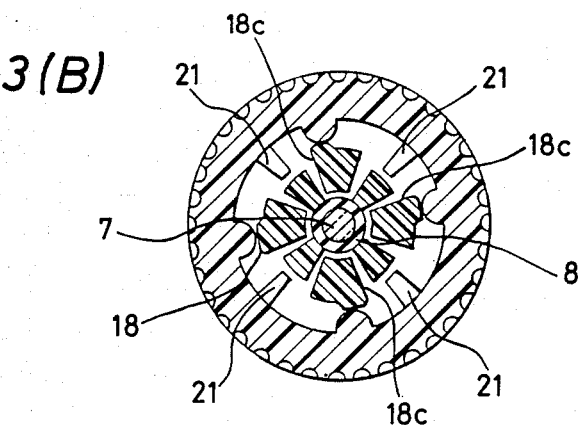
Figure 3C:
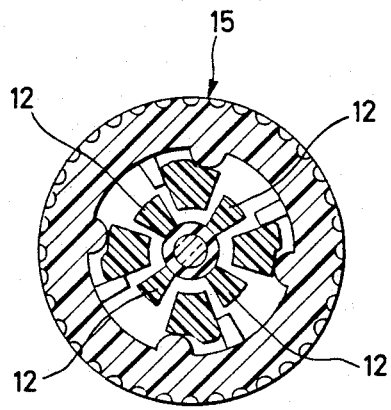
Figure 4:
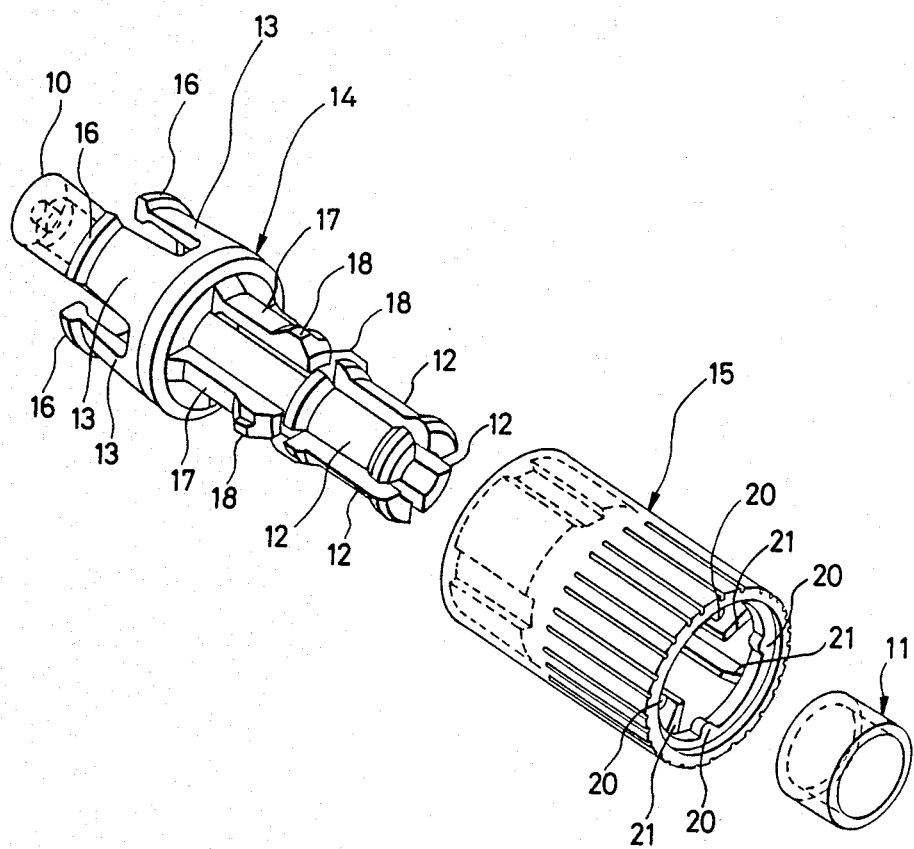
FIG. 4 is an exploded perspective view of a plug.

Embodiments of the present invention will now be described with reference to FIGS. 1 through 6, wherein portions identical to those of the conventional configuration are indicated by the same reference numerals as those, with their descriptions omitted.

Describing first the configuration, reference numeral 1 indicates a receptacle which is identical in configuration to the conventional one. Reference numeral 6' indicates a plug which is composed of an optical fiber cable 9, fixing member 11, holding member 14, and push member 15. On the holding member 14 of the plug 6' an optical fiber holding member 10 of the form of a cylinder extending in the plug insertion direction is provided which is inserted in a hole 2 of the receptacle 1. In the same direction as the above elastic lock segments 13, 13, ... extend from the center of the holding member 14, which are arranged, with slit left therebetween, concentrically around the periphery of the optical fiber holding member 10 so as to form a cylinder. The ends of these lock segments 13, 13, ... have lock portions 16, 16, ... projecting inward therefrom. In the opposite direction to the above there are provided fixing portions 12, 12, ... which are shaped so that they can press and secure the optical fiber cable 9 when pushed by the fixing member 11. And, in the same direction as the above there are provided elastically arm-like cam segments 17, 17, ... distributed cylindrically. On the ends of the cam segments 17, 17, ... there are provided circumferentially cam portions 18, 18, ... having cam portion tops 18a, 18a, ..., cam portion bottoms 18b, 18b, ..., and cam portion side faces 18c, 18c, .... On the push members 15 of the plug 6' there are provided push portions 19, 19, ..., click cams 20, 20, ..., and stoppers 21, 21, .... On the push portions 19, 19, ... there are provided individually push portion bottoms 19a, 19a, ..., push portion inclined faces 19b, 19b, ..., and push portion tops 19c, 19c, ... in a stepped fashion. The click cams 20, 20, ... are provided projectingly in the opposite direction to the push portions 19, 19, .... The positional relationship between the click cams 20, 20, ... and the push portions 19, 19, ... corresponds to that between the lock portions 16, 16, ... provided on the holding member 14 and the cam portions 18, 18, ...; thus, as the push member 15 is turned, the lock portions 16, 16, ... are pushed by the push portion tops 19c, 19c, ... and concurrently the elastic cam portions 18, 18, ... are pushed by the click cams 20, 20, ... and locked thereby. The stoppers 21, 21, ... project inward so that they set a required amount of rotation of the push member 15 through abutting on either side face of each cam segment 17 and either side face 18c of each cam portion provided on the holding member 14. The stoppers 21, 21, ... are located so that they prevent rotation of the push member 15 if it receives a further turning force from the state wherein the cam segments 17, 17, ... and cam portion tops 18a, 18a, ... provided on the holding member 14 lock elastically the click cams 20, 20, .... By the foregoing configuration "click" is created and the push member 15 is locked. The stoppers 21, 21, ... function in a similar manner to the above also in case the push member 15 is released from the locked state and tends to turn further.

The coupling action of the foregoing configuration will now be described. The optical fiber holding member 10 of the plug 6' is inserted into the hole 2 of the plug lock member 3 of the receptacle 1. As the plug 6' is pushed the lock portions 16, 16, ... slide on the periphery of the plug lock member 3 and are further inserted. At this moment, the lock portions 16, 16, ... are at the position where they can enter the push portion bottoms 19a, 19a, ..., thus are near thereto (see FIGS. 1(A) and 2(A)). Then, as the plug 6' is pushed further, the lock portions 16, 16, ... come to the bottom of the stepped portion of the plug lock member 3. At this moment, due to the elasticity of the lock segments 13, 13, ... the lock portions 16, 16, ... enter that bottom (see FIG. 1(B)). Following the above, as the push member 15 is turned in the lock direction, the lock portions 16, 16, ... are pushed toward the plug lock member 3 by means of the push portion inclined faces 19b, 19b, ... (see FIG. 2(B)). In response to a further rotation of the push member 15 in the lock direction, the lock portions 16, 16, ... are pressed onto the plug lock member 3 by means of the push portion tops 19c, 19c, ... (see FIGS. 1(C) and 2(C)). In the respective states of rotation of the push member 15, the cam segments 17, 17, ..., cam portions 18, 18, ..., click cams 20, 20, ..., and stoppers 21, 21, ... forming the click mechanism operate in the following manner: in the state shown in FIGS. 1(B) and 2(A), as the push member 15 is turned in the lock direction, the click cams 20, 20, ... come close to the cam portion tops 18a, 18a, ... (see FIG. 3(A)). Then, in the state shown in FIG. 2(B), as the push member 15 is turned further in the lock direction, the cam portion tops 18a, 18a, ... are pushed by the click cams 20, 20, ..., so that they move elastically toward the optical fiber cable 9 (see FIG. 3(B)). Following the above, in the state shown in FIGS. 1(C) and 2(C), as the push member 15 is turned further in the lock direction, the click cams 20, 20, ... turn; thus, the cam portion bottoms 18b, 18b, ... push the click cams 20, 20, .... At the moment the click cams 20, 20, ... climb over from the cam portion tops 18a, 18a, ... to the cam portion bottoms 18b, 18b, ..., there appears a change in rotation of the push member 15, and this change causes a sense of click. In this state, even if the push member 15 is caused to rotate, the stoppers 21, 21, ... abut on the side faces of the cam segments 17, 17, ... and the cam portion side faces 18c, 18c, ...; thus, a further rotation is blocked (see FIG. 3(C)).

Figure 5:
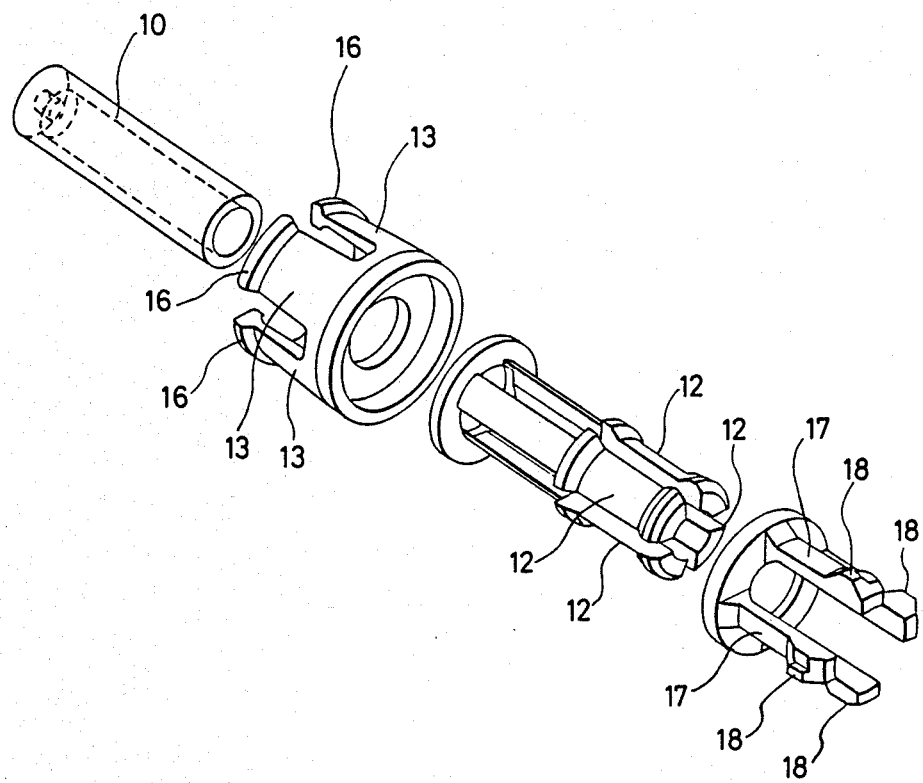
FIG. 5 is an exploded perspective view of a holding member of a second embodiment of the present invention.

FIG. 5 shows a second embodiment of the present invention. In this embodiment, the respective portions of the holding member 14 are made independent according to the function. These independent components, some of which may be formed by two or more identical molded parts, are assembled into a single body by the use of screws, bonding agent, etc. and achieve the same action as the above.

Figure 6A:
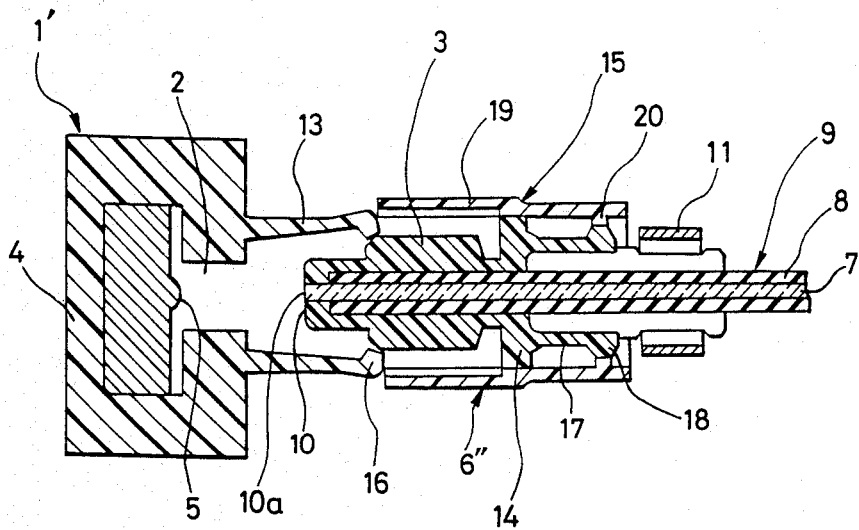
FIG. 6 is a sectional view of an important portion showing the plug insertion states of a third embodiment of the present invention.
Figure 6B:
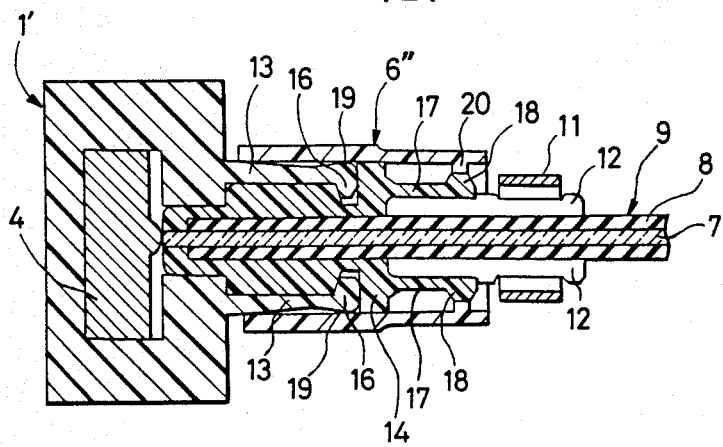
Figure 7:
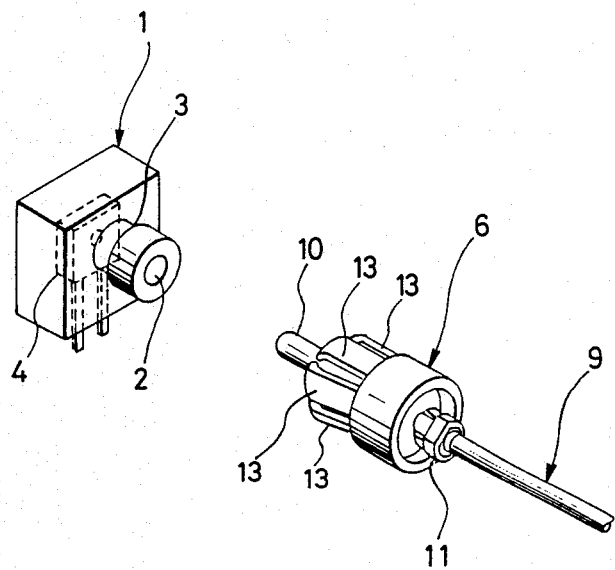
FIG. 7 is a perspective view of a receptacle and plug of the conventional configuration.
Figure 8:
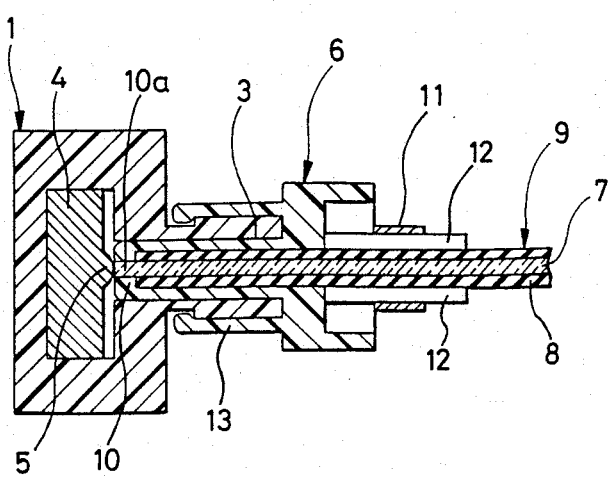
FIG. 8 is a sectional view of an important portion in the plug insertion state.

FIG. 6 shows a third embodiment of the present invention. In this embodiment, the lock segments 13, 13, ... are provided on the receptacle 1, which have the lock portions 16, 16, ... projecting inward from their end portions. The plug lock member 3 of circular cylinder shape with a stepped portion on the periphery is provided on the plug 6" and adapted for engagement with the lock portions 16, 16, ....

According to the present invention, there can be realized a multi-pole optical connector, prism-shaped optical connector, and the like for a multi-core optical fiber cable, with achieving the same coupling action as the above.

Further, the same coupling action as the above can be achieved even when the push member 15 and click mechanism are provided on the receptacle 1 or adapter, this being another embodiment of the present invention.

As described hereinabove, according to the present invention, the push member 15 is movable in the direction intersecting the attaching/detaching direction of the plug 6' to press and secure the lock portions 16, 16, ... between the push portion tops 19c, 19c, ... and the plug lock member 3; thus, the optical fiber holding member 10 coupled integrally with the lock portions 16, 16, ... is secured in the receptacle 1 and cannot slide even if an external stress is applied thereto. To maintain the above state the click mechanism is provided; thus, the positional relationship between the light emitting spot 5 of the optical converting element 4 and the end face of the optical fiber 7 does not change even if an external stress is applied to the plug 6', so that the optical conversion efficiency is stable and even if continuous vibration is applied under the above state, the push member 15 is held by the click mechanism and its locked state is not released. Further, in case the optical fiber cables 9 are coupled mutually and held in the locked state as above, the push member 15 does not turn even if the cable is handled while the adapter section is abutting on the corner of some furniture in the work of making a network of optical fiber cables; thus, the locked state cannot be released. As is apparent from the foregoing function of the coupling configuration of the present invention, there results in the effect that the optical signal can be transmitted at a very high degree of reliability and quick attaching/detaching work can be attained by moving the push member in the direction intersecting orthogonally the attaching/detaching direction of the plug.

What is claimed is:

1. An optical connector comprising:
   a plug lock member for receiving an optical fiber end inserted along a center axis therein and having at least one engaging portion formed at a first angular position radially outwardly from said center axis;
   a plug which is concentrically attachable to and detachable from said plug lock member, said plug including a cylindrical outer push member having one end facing toward said plug lock member and another end opposite therefrom, said one end having at least one push portion formed concentrically and radially outwardly from said center axis, and said other end having at least one click cam formed concentrically and radially outwardly from said center axis; and
   a holding member having an inner holding portion for holding an optical fiber end along said central axis therein, at least one engagement portion formed at said first angular position radially outwardly from said center axis at one part of said holding member, and at least one cam portion formed at a second angular position radially outwardly from said center axis at another part of said holding member,
   wherein said engaging portion of said plug lock member and said engagement portion of said one part of said holding member, which are located at said first angular position relative to said central axis, become mated in axial locking relationship when said holding member holding said optical fiber end is inserted in said plug lock member, and
   wherein said plug is axially attachable on said plug lock member and said holding member inserted therein, and said push member thereof is angularly rotatable so as to rotate said push portion to said first angular position, wherein it presses said engaging portion of said plug lock member and said engagement portion of said holding member tightly in said locking relationship, and simultaneously with said angular rotation of said push member said click cam on the other end thereof is rotated to said second angular position so as to engage said cam portion on said other part of said holding member with a click locking action.

2. An optical connector according to claim 1, wherein said plug includes further fixing portions (12) and a fixing member (11) for fixing said plug on the optical fiber.

3. An optical connector according to claim 1, wherein said plug lock member has a plurality of stepped engaging portions arranged concentrically at spaced first angular positions,
   said holding member has a corresponding plurality of shoulder engagement portions arranged concentrically at said spaced first angular positions on a forward part thereof facing said plug locking member, which slide axially and lock onto said stepped engaging portions of said plug lock member, and a plurality of cam portions arranged concentrically at spaced second angular positions, which are the same as said spaced first angular positions, on a rearward part thereof, and
   said push member has a corresponding plurality of push portions, having respective push portion tops on which said shoulder engagement portions of said holding member abut and are pressed toward said engaging portions of said plug lock member at said first angular positions, and inclined faces leading to said push portion tops, formed at a forward end thereof facing said plug locking member, and a plurality of click cams, including respective stopper portions spaced therefrom, between which said cam portions of said holding member are snapped in said click locking action at said first angular positions, formed at a rearward end thereof.

4. An optical connector according to claim 1, wherein said plug lock member has a plurality of shoulder engaging portions arranged concentrically at spaced first angular positions, said holding member has a corresponding plurality of stepped engagement portions arranged concentrically at said spaced first angular positions on a forward part thereof facing said plug locking member, which said shoulder engaging portions of said plug lock member slide axially and lock onto, and a plurality of cam portions arranged concentrically at spaced second angular positions, which are the same as said spaced first angular positions, on a rearward part thereof, and said push member has a corresponding plurality of push portions, having respective push portion tops on which said shoulder engaging portions of said plug lock member abut and are pressed toward said engagement portions of said holding member at said first angular positions, and inclined faces leading to said push portions tops, formed at a forward end thereof facing said plug locking member, and a plurality of clicks cams, including respective stopper portions spaced therefrom, between which said cam portions of said holding member are snapped in said click locking action at said first angular positions, formed at a rearward end thereof.

* * * * *